July 31, 1962 — R. L. SAYLOR — 3,047,319
LINKAGE JOINT
Filed April 13, 1959 — 2 Sheets-Sheet 1
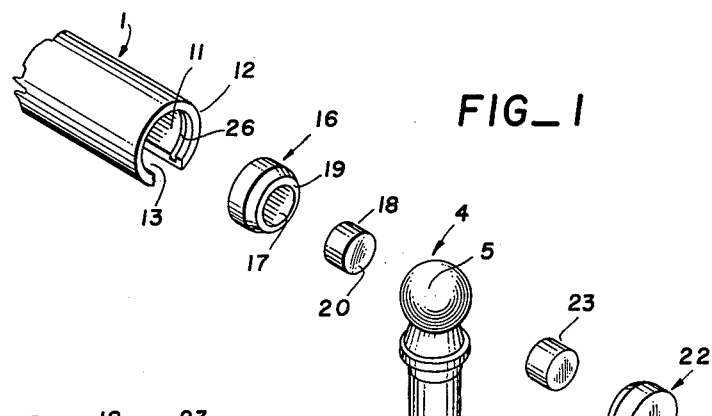
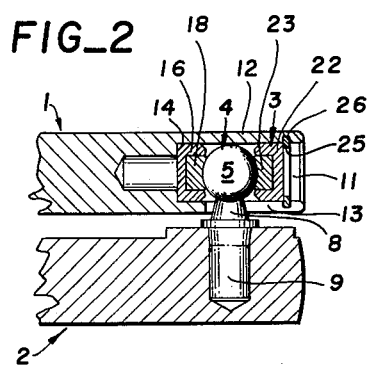
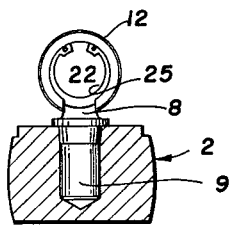
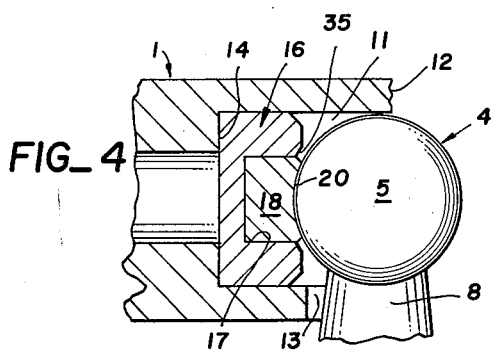
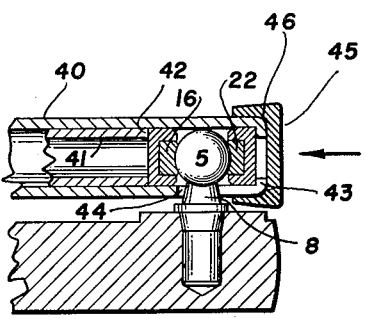
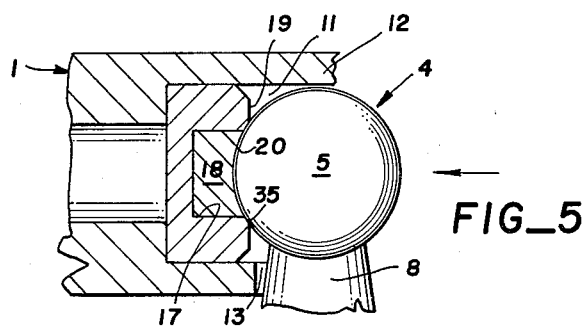
INVENTOR.
ROBERT L. SAYLOR
BY
Boyken, Mohler + Wood

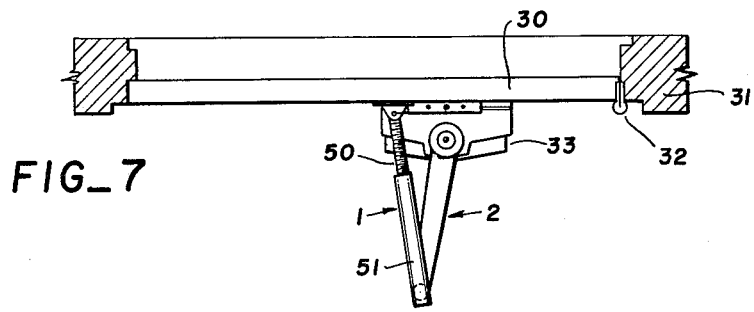
FIG_7
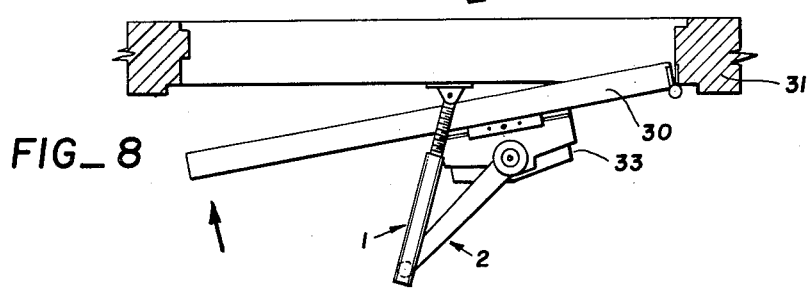
FIG_8
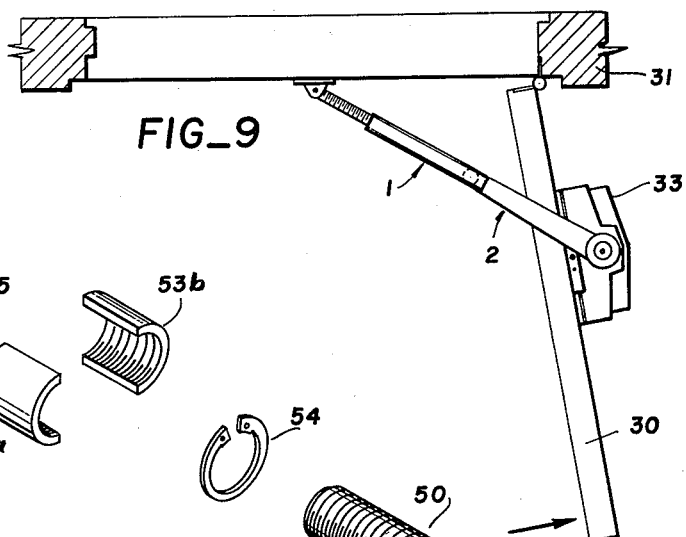
FIG_9
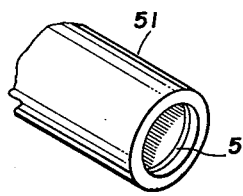
FIG_10
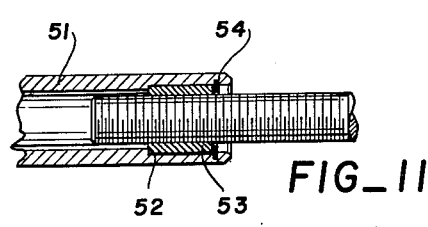
FIG_11

United States Patent Office 3,047,319
Patented July 31, 1962

3,047,319
LINKAGE JOINT
Robert L. Saylor, San Francisco, Calif., assignor to Schlage Lock Company, a corporation
Filed Apr. 13, 1959, Ser. No. 805,814
3 Claims. (Cl. 287—90)

This invention relates to a linkage and a linkage joint for pivotally connecting the adjacent ends of a pair of links or rods.

More particularly the invention is directed to a novel linkage joint of the ball-and-socket type permitting self alignment of the links and at the same time involving a minimum of parts, and providing effective resistance to relatively heavy forces.

An important object of the invention is the provision of an improved linkage which is simple to assemble and which is efficient under adverse conditions of wear and loading.

Other objects of the invention will be seen from the following specification and from the drawings.

FIG. 1 is an exploded perspective of the various elements in the linkage joint;

FIG. 2 is a fragmentary longitudinal section through the joint;

FIG. 3 is a vertical section through the link containing the ball member showing the end of the link containing the socket member in elevation;

FIG. 4 is a greatly enlarged fragmentary longitudinal section showing the manner in which the inner socket member cooperates with the ball member;

FIG. 5 is a view similar to FIG. 4 showing the bearing element in its compressed condition;

FIG. 6 is a longitudinal section through the socket link showing a different method of closing the end of the link;

FIG. 7 is a semischematic top plan view of a door assembly showing the linkage applied to a door closer;

FIG. 8 is a view similar to FIG. 7 showing the door slightly open;

FIG. 9 is a view similar to FIG. 7 showing the door in a wide open position;

FIG. 10 is a fragmentary exploded view of the various elements connecting the two portions of the socket link;

FIG. 11 is a fragmentary longitudinal view of the assembled portions of the socket link.

In detail, and with reference to FIG. 2 the present invention provides a pair of pivotally connected links generally designated 1, 2. Link 1 is provided with a socket assembly generally designated 3 and link 2 is provided with a ball member generally designated 4. It will be understood in this connection that the term "ball member" contemplates various shapes including spherical, cylindrical and barrel shape although in the drawings a spherical ball 5 is shown cooperating with the socket assembly.

As best seen in FIGS. 2–5 the ball member 4 includes a shank 8 and a cylindrical portion 9 that is press fitted into or otherwise secured to the link 2 adjacent the end of the latter.

In the form shown in FIGS. 1–5 the link 1 is a solid rod provided at its end with an axially outwardly opening recess 11 having sidewalls 12. The sidewalls 12 are provided with a longitudinally extending slot 13 opening outwardly of the open end of the link for receiving therein the shank 8 of ball member 4.

Recess 11 is formed to provide an annular shoulder 14 (FIG. 4) against which is abutted an inner bearing cup generally designated 16. This bearing cup 16 is generally cylindrical and is snugly received within recess 11 (FIG. 4); it is provided with a central recess 17 opening outwardly toward the ball 5 for receiving therein a bearing element 18.

Bearing element 18 is preferably made of a plastic of good wearing qualities such as nylon and having a relatively low modulus of elasticity compared to steel. Bearing element 18 conforms closely to the internal shape of recess 17 and extends at its outer side beyond the open end 19 of cup 16. The outer face 20 of the element 18 is formed complementarily to the ball 5 to permit relative sliding between said element 18 and said ball 5.

Similarly, on the opposite side of ball 5 there is provided a bearing cup 22 identical to cup 16 and provided with a bearing element 23 identical to element 18.

The socket members which comprise cups 16, 22 and elements 18, 23 are spaced apart along recess 11 in link 1 a predetermined distance so that some pressure is applied to ball 5 by the bearing elements when the linkage is in normal unloaded condition.

The means by which the predetermined spacing of the socket members is achieved in the embodiment shown in FIG. 2 is a split ring 25 which is received within a radially inwardly opening groove 26 formed in the sidewalls 12 of link 1. In such a case pressure must be applied to cup 22 from the open end of the recess 11 to force cup 16 against shoulder 14 before the split ring 25 is compressed and inserted in groove 26. This of course provides an effective means for insuring that the desired amount of bearing pressure is achieved between ball 5 and the bearing elements 18, 23.

The above described linkage joint is particularly effective for use in a door closer linkage as can be seen by reference to FIGS. 7, 8, 9. In such a case the socket link 1 is pivotally secured at its end opposite the socket to a door frame 31 to which is swingably supported a door 30 by means of hinges 32. The end of link 2 opposite the ball end is pivotally secured to a door closer 33 carried by door 30.

When the door 30 is in the wide open position of FIG. 9 it will be seen the links 1, 2 form a straight angle and are substantially in alignment except for their offset relationship. In such an open position if one attempts to force the door open wider it is seen that the outer cup 22 and bearing element 23 effectively resist such movement.

Also, in the substantially closed position of FIG. 8 if one attempts to force the door closed faster than the door closer 33 is designed to permit it, the fact that the links form a relatively small acute angle results in an almost axially directed load on bearing cup 16 and bearing element 18 which, of course, are properly positioned to resist such load.

Intermediate the positions of FIGS. 8 and 9 the linkage is not normally subjected to heavy loads and the bearing elements 18, 23 provide effective bearing for the ball 5.

By the present invention an additional safeguard against failure of the joint is provided as is best seen in FIGS. 4, 5. It will be noted that the open end 19 of the cup 16 is provided with an annular shoulder 35 beyond which the element 18 normally projects so that only the plastic is ordinarily in sliding engagement with the ball. However, if an excessive force is applied to ball 5 in the direction shown by the arrow in FIG. 5, the plastic element 18 is compressed to such an extent that the ball 5 engages shoulder 35 which is complementarily formed relative thereto and is effectively restrained. By making cup 16 of a metal such as steel having a relatively high modulus of elasticity and employing a plastic such as nylon for the bearing element 18 an excellent bearing is provided and, at the same time, effective resistance to overloading is insured.

It will be noted that this desirable result is possible because the plastic bearing element 18 is constrained on all sides against plastic flow. If such were not the case the ball 5 would not be restrained to a sufficient extent even during normal operation of the linkage.

It will be noted that the excessive loading illustrated in FIG. 5 may occur when the door 30 is forcibly urged to its closed position in FIG. 8. Since the cup 22 and bearing element 23 are identical to cup 16 and bearing element 18 respectively, excessive loading caused by forcibly urging the door open from its wide open position in FIG. 9 will be resisted by cup 22 in the same manner as described in connection with cup 16.

An important advantage of the ball and socket construction shown resides in the fact that even if the plastic bearing elements are melted by a fire the joint will still operate with the ball cooperating with the bearing cups.

A modified form of socket link is shown in FIG. 6. In this case the link is formed from a length of tubing 40 into which an inner tube 41 is snugly received so that the end 42 of the inner tubing provides a shoulder similar to shoulder 14 of FIG. 4. The same bearing cups 16, 22 are received within the end of tubing 40 with cup 16 in abutment with the shoulder 42 formed by inner tubing 41.

In this case the split ring 25 is eliminated by peening or crimping over the end of tubing 40 to form an annular flange 43 which abuts outer bearing cup 22 and secures the same in its proper position relative to cup 16.

Tube 40 is of course provided with a longitudinally extending slot 44 opening outwardly of the end of tube 40 for receiving the shank 8 of the ball 5 therein. Since cup 22 may be subjected to a relatively high load tending to force it outwardly of the open end of tube 40 it is necessary to prevent the slotted end of the tube from spreading open under such load. This is accomplished by a cap 45 which is press fitted over the end of tube 40.

It has been found that maximum strength may be achieved with a minimum of labor by forming the cap 45 with an internal swaging surface 46 so that as said cap 45 is driven onto tube 40 it automatically crimps the end of the tube radially inwardly to form the annular flange 43, as seen in FIG. 6.

In order to permit installing the links 1, 2 in the particular assembly involved it is desirable to be able to adjust the effective length of one of the links. In the drawings link 1 is shown as adjustable and comprises a pair of link portions 50, 51 (FIGS. 7, 10) with portion 50 being a threaded rod telescopically received within the portion 51. Portion 51 may be a length of tubing or a solid rod provided with an axially outwardly opening recess to receive portion 50 therein.

Portion 51 is provided with an internal annular shoulder 52 (FIG. 11) against which is abutted an internally threaded nut 53 which in turn is held in the link portion 51 by any convenient means such as by split ring 54 received in groove 55. Link portion 50 is threadedly received in nut 53.

In order to simplify and speed up assembly of the link portions nut 53 is split along a longitudinally extending plane to provide a pair of halves 53a and 53b. In this manner the nut halves may be applied against the threaded rod 50 and inserted with said rod into portion 51 so that the proper effective length of link 1 may be achieved without having to rotate portion 50 relative to portion 51. Of course adjustment may readily be effected if required after assembly through relative rotation of the parts.

The above specific description of the preferred forms of the invention should not be taken as restrictive thereof as it is obvious that various modifications in design may be resorted to without departing from the spirit of the invention.

I claim:

1. A linkage joint for pivotally connecting a pair of links comprising: a spherical ball member carried by one of said links and a pair of similar socket members axially spaced apart in the other of said links for supporting said ball member at opposite sides thereof, each of said socket members comprising a bearing cup having an open side directed toward the adjacent side of said ball member, a bearing element tightly received in each of said cups and extending only slightly beyond said open side to provide a bearing face formed complementarily to the adjacent side of said ball and in slidable engagement therewith, each of said bearing cups being formed with an annular shoulder surrounding said open side and of a diameter substantially less than the diameter of said ball and engaging said ball when the latter is forcibly urged against said open side to compress said element completely into said cup.

2. A linkage joint for pivotally connecting a pair of links comprising: a spherical ball member carried by one of said links and a pair of similar socket members axially spaced apart in the other of said links for supporting said ball member at opposite sides thereof, each of said socket members comprising a bearing cup having an open side directed toward the adjacent side of said ball member, a bearing element tightly received in each of said cups and extending only slightly beyond said open side to provide a bearing face formed complementarily to the adjacent side of said ball and in slidable engagement therewith, each of said bearing cups being formed with an annular shoulder surrounding said open side and engaging said ball when the latter is forcibly urged against said open side to compress said element within said socket, said bearing element being formed of a compressible plastic having a modulus of elasticity substantially less than that of the bearing cup, said annular shoulder having an inner diameter substantially less than the diameter of said ball, said bearing element lying entirely within the projected area of said open side and being entirely received within the cup when said ball engages said shoulder.

3. In a ball and socket joint which includes a ball member of substantially spherical shape and a pair of socket portions on opposite sides of said ball member and cooperating to form a socket in which said ball is swivelly received, each of said socket portions comprising a cup having an open side directed toward said ball member and a bearing element tightly received within said cup and extending slightly beyond said open side to provide a bearing face formed complementarily to said ball member, said open side of said cup being formed to provide an annular shoulder having an inner diameter substantially less than the diameter of said ball whereby said shoulder engages said ball member when the latter is urged toward said cup with sufficient force to compress said element entirely into said cup, the portion of said element extending beyond said open end being formed with a frustoconical sidewall having its least diameter at said bearing face whereby said portion of said element is entirely received within the projected area of said open end.

References Cited in the file of this patent

UNITED STATES PATENTS

| | | |
|---|---|---|
| 50,190 | Watson | Sept. 26, 1865 |
| 468,529 | Beardsley | Feb. 9, 1892 |
| 738,503 | Waters | Sept. 8, 1903 |
| 1,508,097 | Hassler | Sept. 9, 1924 |
| 1,718,229 | Graham | June 25, 1929 |
| 1,901,924 | Nalle | Mar. 21, 1933 |
| 1,916,744 | Skillman | July 4, 1933 |
| 2,337,711 | Crake | Dec. 28, 1943 |
| 2,880,025 | Herbener et al. | Mar. 31, 1959 |

FOREIGN PATENTS

| | | |
|---|---|---|
| 760,363 | Germany | May 26, 1953 |
| 805,210 | Germany | May 10, 1951 |
| 223,794 | Great Britain | Oct. 30, 1924 |